United States Patent
Tamizkar

(10) Patent No.: US 11,463,359 B2
(45) Date of Patent: Oct. 4, 2022

(54) METHOD AND AN APPARATUS FOR ROUTING DATA PACKETS IN A NETWORK

(71) Applicant: Telia Company AB, Solna (SE)

(72) Inventor: Babak Tamizkar, Stockholm (SE)

(73) Assignee: Telia Company AB

(*) Notice: Subject to any disclaimer, the term of this patent is extended or adjusted under 35 U.S.C. 154(b) by 116 days.

(21) Appl. No.: 17/036,773

(22) Filed: Sep. 29, 2020

(65) Prior Publication Data
US 2021/0105209 A1 Apr. 8, 2021

(30) Foreign Application Priority Data
Oct. 3, 2019 (SE) .................................. 1951128-6

(51) Int. Cl.
| | |
|---|---|
| *H04W 56/00* | (2009.01) |
| *H04L 45/745* | (2022.01) |
| *H04L 12/46* | (2006.01) |
| *H04L 45/02* | (2022.01) |
| *H04L 45/00* | (2022.01) |

(52) U.S. Cl.
CPC ........ *H04L 45/745* (2013.01); *H04L 12/4633* (2013.01); *H04L 45/02* (2013.01); *H04L 45/72* (2013.01)

(58) Field of Classification Search
CPC ... H04L 45/745; H04L 12/4633; H04L 45/02; H04L 45/72
USPC ......................................................... 370/392
See application file for complete search history.

(56) References Cited

U.S. PATENT DOCUMENTS

| | | | |
|---|---|---|---|
| 2005/0129001 A1 | 6/2005 | Backman et al. | |
| 2010/0284305 A1 | 11/2010 | Papp et al. | |
| 2010/0329252 A1 | 12/2010 | Mulamalla et al. | |
| 2014/0198794 A1* | 7/2014 | Mehta ................. | H04L 12/4633 370/392 |

(Continued)

FOREIGN PATENT DOCUMENTS

| | | |
|---|---|---|
| CN | WO2019/129236 A1 | 7/2019 |
| WO | WO 2019/129236 A1 | 7/2019 |

OTHER PUBLICATIONS

Swedish Search Report from the Swedish Patent and Registration Office, dated Sep. 8, 2020, for Swedish Patent Application 1951128-6.

(Continued)

*Primary Examiner* — Sai Ming Chan
(74) *Attorney, Agent, or Firm* — Burr & Forman LLP; Jeffrey H. Kamenetsky

(57) ABSTRACT

The embodiments herein relate to a method and a router device for routing data packets using virtual routing and forwarding (VRF). The method includes; configuring a first loopback interface and assigning a first VRF (VRF1); configuring a second loopback interface and assigning a second VRF (VRF2); configuring first and second GRE tunnels and assigning the tunnels to respective VRF; assigning for each GRE tunnel a source and a destination point, configuring source and destination IP addresses of both GRE tunnels to use the same routing table from a routing table of VRF1 or from a routing table of VRF2; configuring a first static to route data packets destined to a network behind VRF2; and configuring a second static route to route data packets destined to a network behind VRF1.

11 Claims, 7 Drawing Sheets

(56) References Cited

U.S. PATENT DOCUMENTS

2016/0380823 A1* 12/2016 Shen .................. H04L 12/4633
370/254

OTHER PUBLICATIONS

Extended European Search Report from the European Patent Office, dated Feb. 5, 2021, for European Patent Application 20197511.7.
Aruba: "Solution Guide for Inter-VRF Route Leaking", Apr. 30, 2019, XP055769203, retrieved from the internet: URL: https://higherlogicdownload.s3.amazonaws.com/HPE/MigratedAssets/lnterVRF%20Route%20Leaking%20ArubaOS-CX.pdf [retrieved on Jan. 27, 2021] —relevant to claims 1, 4-6, 9-11.

* cited by examiner

METHOD AND AN APPARATUS FOR ROUTING DATA PACKETS IN A NETWORK

TECHNICAL FIELD

The present disclosure relates generally to the field of data communications, and more particularly to a method and an apparatus for routing data packets using virtual routing and forwarding.

BACKGROUND

VRF (Virtual Routing and Forwarding) is a technology implemented in a network apparatus or in a network device such as a router device that enables the creation of operation of multiple instances of a routing table simultaneously. VRF enables the router to configure the instances of router within it, each of which operates separately and has its distinct and overlapping set of Internet Protocol (IP) addresses. VRF can also be called Virtual Router and Forwarder.

VRF works like a typical router with its unique routing table, table entries and routing protocols and may also be used to create VPN (Virtual Private Network) tunnels.

FIG. 1 illustrates an example of a network scenario 100 involving a first network denoted customer A (Cust A) 110 having an IP network address 8.8.8.0/24 and a second network denoted customer B (Cust-B) 120 having an IP network address 7.7.7.0/24. FIG. 1 also shows four routers R1 101, R2 102, R3 103 and R4 104. Router R3 103 is shown connected to Cust-A 110 and router R4 104 is connected to Cust-B 120. The network between R1 101 and R2 102 may be the internet or any type of network.

Two VRFs named L-VRF 105 and R-VRF 106 are also shown. L-VRF 105 is assigned to physical interface e1/0 of router R1 101 and R-VRF 106 is assigned to physical interface e1/0 of router R2 102. The physical interfaces of the other routers are also depicted.

If a connection is to be stablished between the networks Cust-A 110 and Cust-B 120 through existing VRFs, a standard solution is to run dynamic routing and using MP-BPG (MultiProtocol-Boarder Gateway Protocol) to advertise the prefixes between the VRFs.

Another option would be to use static routes to route traffic or data packets destined to prefix 7.7.7.0/24 from L-VRF 105 towards R-VRF 106 using e.g. the following command line on router R1 101:
R1 #
ip route vrf l-vrf 7.7.7.0/24 40.0.0.1

Actually, it is not a static route from L-VRF 105 towards R-VRF 106. Instead it is a static route from L-VRF 105 to a destination IP address 40.0.0.1. But the reason it is possible to have, in this case, a static route is because the destination IP address on R-VRF 106 is placed on a physical interface of another router and hence it does not matter what VRF is assigned to that physical interface.

Hence, in view of the scenario depicted in FIG. 1, routing traffic statically from a source VRF to a destination VRF requires that the destination VRF be placed on a physical interface, which is thus a limitation.

FIG. 2 illustrates another example of a network scenario involving additional VRF(s). In this scenario, the two VRFs L-VRF 105 and R-VRF 106 are both placed on different physical interfaces of router R1 101 e1/1 respectively e1/0.

Assume that we want to route traffic or data packets between two VRFs either in the same router or in different routers, when the VRFs are not placed on any physical interface. FIG. 2 depicts two additional VRFs which are here considered to be inside or within router R1 101. These VRFs are denoted VRF1 107 and VRF2 108.

A connection between Cust-A 110 and Cust-B 120 could be:
8.8.8.0/24<->L-VRF<->VRF1<->VRF2<->R-VRF<->7.7.7.0/24

The issue with this configuration is that by simply using a static route between these internal interfaces VRF1 107<->VRF2 108 the traffic would not be allowed to leak between these two internal interfaces.

One solution would be to design the configuration of FIG. 2 such that both VRF1 107 and VRF2 108 are placed on physical interfaces and connect them through an external network device/equipment such as a switch device.

FIG. 3 illustrates such a scenario involving a switch device 109. As shown, VRF1 107 is placed on physical interface e1/2 of router R1 101 and VRF2 108 is placed on physical interface e1/3 of R1 101. With this design involving the external switch device 109, it is possible to configure or create a static route between VRF1 107 and VRF2 108 because the source and destination VRF are placed on physical interfaces so traffic can be routed.

It should also be mentioned network Cust-A 110 and network Cust-B 120 are not directly connected to the VRFs. Instead they are behind the VRFs with one or more hop distances. If Cust-A 110 and Cust-B 120 were directly connected to the VRFs through physical interfaces, a standard solution to connect them is by using the BGP MPLS (MultiProtocol Label Switching) Route leaking technique.

There are however drawbacks with the above solution which requires extra hardware equipment, including:
a) Two or more physical interfaces on the router device
b) An external switch or at least two switch ports if a switch is already included in the network scenario
c) Small Form-factor Pluggable(s) (SFPs) maybe required on the router and/or on the switch
d) Physical cables are required to connect the router to the switch.

In addition, the routing process increases and introduces latency because of having back and forth traffic between the router and the external switch. Further, service stability level may be affected and is not scalable. Further, the required redundancy increases with the number of extra hardware needed.

There is therefore a need for a solution that allows configuring static routes between VRFs within a router device for advertising prefixes between the VRFs and successfully route packets between the networks through the internal VRFs of the router device. It should be mentioned that the networks are not directly connected to the router device. Instead they are behind the VRFs with one or more hop distances.

SUMMARY

It is an object of embodiments herein to solve the above problems by providing a method performed by a router device and a router device that allow configuration of static routes between virtual route forwarders within the router device for advertising prefixes between the VRFs and successfully route packets between the internal VRFs.

According to an aspect of embodiments herein, there is provided a method performed by a router device, the method comprising: configuring a first loopback interface and assigning an internal Virtual Route Forwarder (VRF1) to the first loopback interface; configuring a second loopback interface and assigning an internal Virtual Route Forwarder (VRF2) to the second loopback interface; said internal VRF2 being different from the internal VRF1; creating or configuring at least a first Generic Routing Encapsulation (GRE) tunnel and a second GRE tunnel to be used by interfaces within the router device; assigning the first GRE tunnel to the internal VRF1 and assigning the second GRE tunnel to the internal VRF2. For the first GRE tunnel, assigning the first loopback interface as a source point of the first GRE tunnel and assigning the second loopback interface as a destination point of the first GRE tunnel. For the second GRE tunnel, assigning the second loopback interface as a source point of the second GRE tunnel and assigning the first loopback interface as a destination point of the second GRE tunnel. The method further comprises: configuring a source Internet Protocol (IP) address and a destination IP address of both the first GRE tunnel and the second GRE tunnel to use the same routing table from a routing table of VRF1 or from a routing table of VRF2; creating or configuring a first static route on VRF1 to route data packets destined to a network behind VRF2 by defining the IP address of the second GRE tunnel as the destination; and creating or configuring a second static route on VRF2 to route traffic destined to a network behind VRF1 by defining the IP address of the first GRE tunnel as the destination.

According to another aspect of embodiments herein, there is provided a router device comprising a processor and a memory, said memory containing instructions executable by said processor whereby the router device is operative to: configure a first loopback interface and assign an internal Virtual Route Forwarder (VRF1) to the first loopback interface; configure a second loopback interface and assign an internal Virtual Route Forwarder (VRF2) to the second loopback interface; said internal VRF2 being different from the internal VRF1; create or configure at least a first Generic Routing Encapsulation (GRE) tunnel and a second GRE tunnel to be used by interfaces within the router device; assign the first GRE tunnel to the internal VRF1 and assigning the second GRE tunnel to the internal VRF2. For the first GRE tunnel, assign the first loopback interface as a source point of the first GRE tunnel and assign the second loopback interface as a destination point of the first GRE tunnel. For the second GRE tunnel, assigning the second loopback interface as a source point of the second GRE tunnel and assigning the first loopback interface as a destination point of the second GRE tunnel; The router device is further operative to assign the first GRE tunnel to the internal VRF1 and assigning the second GRE tunnel to the internal VRF2; configure a source IP address and a destination IP address of both the first GRE tunnel and the second GRE tunnel to use the same routing table from a routing table of VRF1 or from a routing table of VRF2; create or configure a first static route on VRF1 to route data packets destined to a network behind VRF2 by defining the Internet Protocol (IP) address of the second GRE tunnel as the destination; and create or configure a second static route on VRF2 to route data packets to a network behind VRF1 by defining the IP address of the first GRE tunnel as the destination.

An advantage with embodiments herein is to achieve routing between internal VRFs by configuring static routes between the internal VRFs within a router device for advertising non-directly connected prefixes.

Another advantage with embodiments herein is that there no need to have extra hardware equipment or resource to achieve the routing between the internal VRFs or through the VRFs.

Yet another advantage with embodiments herein is that the solution is more scalable compared to standard solutions.

A further advantage with embodiments herein is that running the router internally is much faster instead of back and forth traffic between a router device and e.g. an external switch device.

Additional advantages achieved by the embodiments of the present invention will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Hereinafter, is described according to embodiments herein, a solution performed by a router device for configuring or creating static routes between VRFs within the router device for enabling routing of packets.

It should be noted that the embodiments herein may be employed in any network involving any number router devices with the capability to configure virtual routing forwarding.

Figure 1:
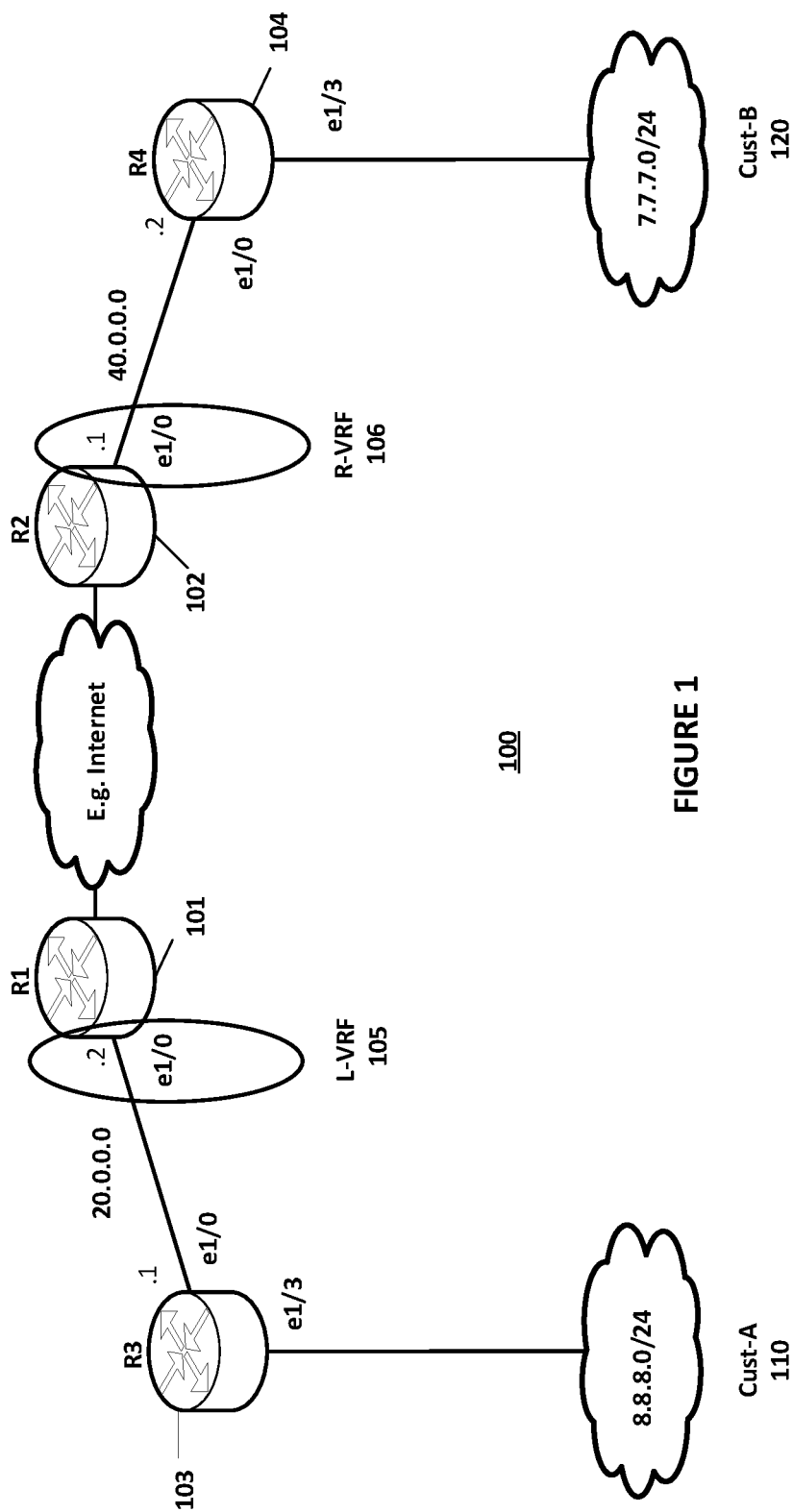
FIG. 1 is an example of a network scenario involving routers and an example of two VRFs placed on two separate physical interfaces in separate routers.
Figure 2:
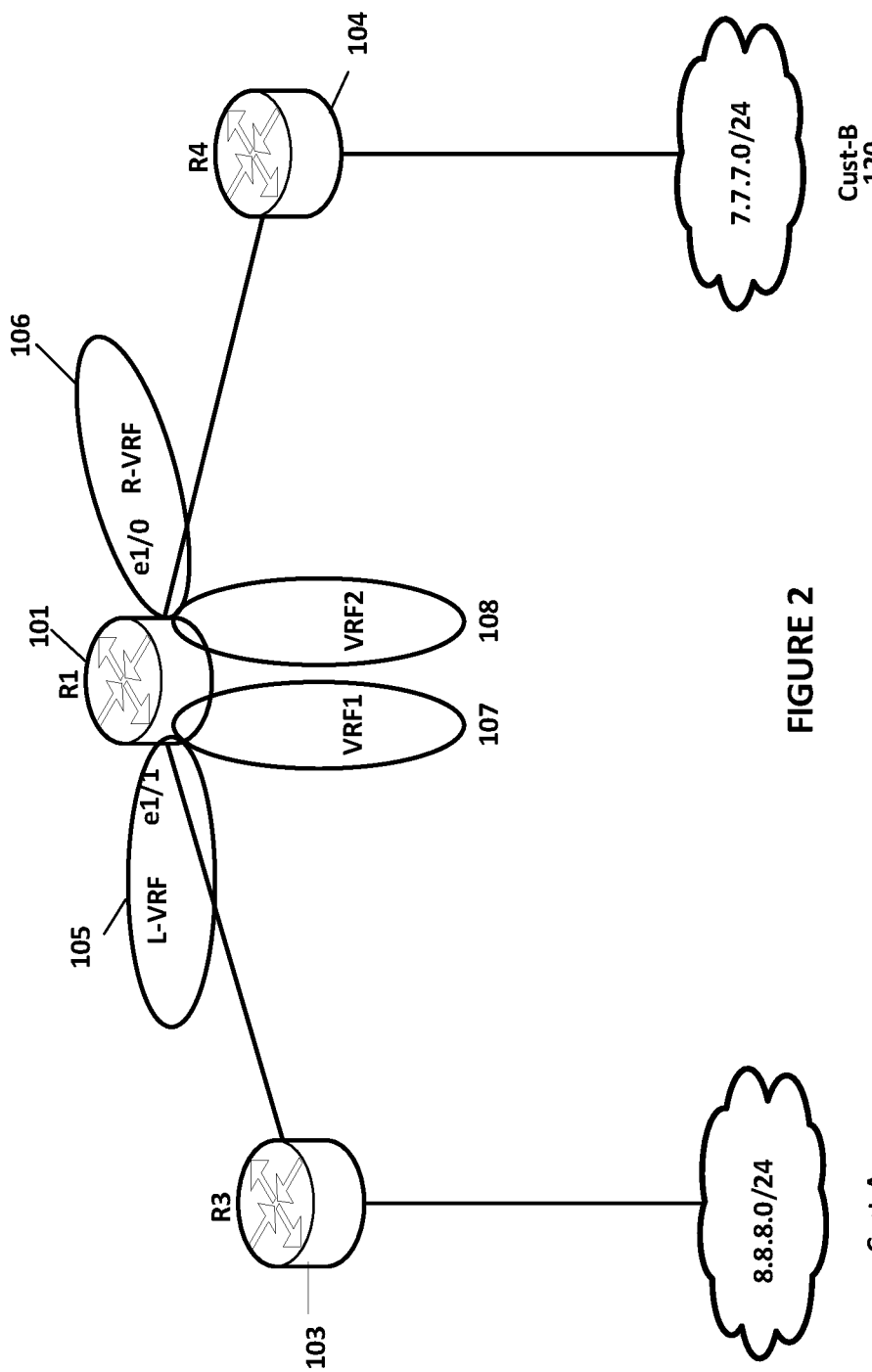
FIG. 2 is another example of a network scenario involving routers and VRFs placed on physical interfaces in one router and also involving internal VRFs placed in the same router.
Figure 3:
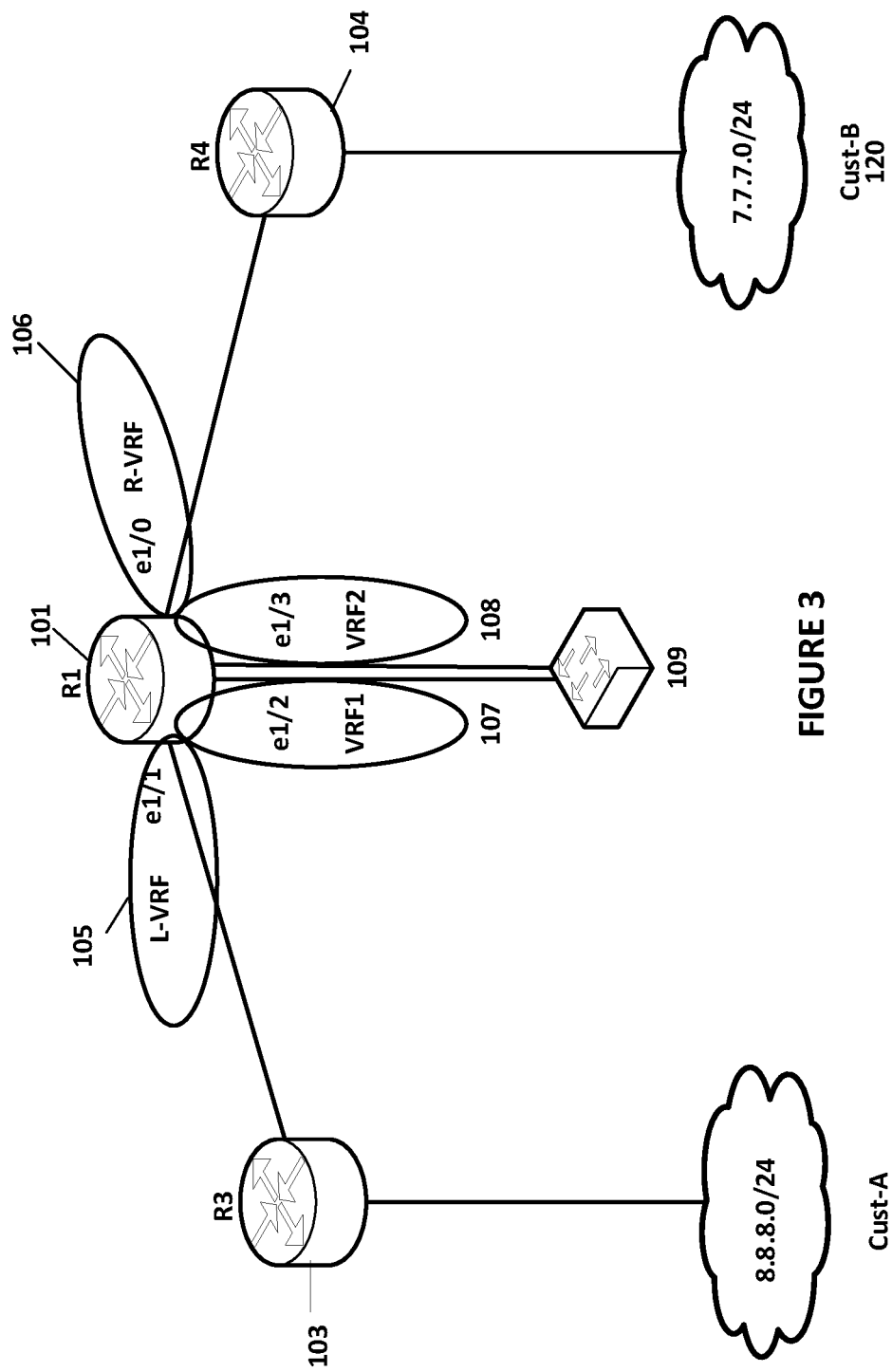
FIG. 3 illustrates the network scenario of FIG. 2 with the addition of an external switch device/equipment connected to a router device.
Figure 4:
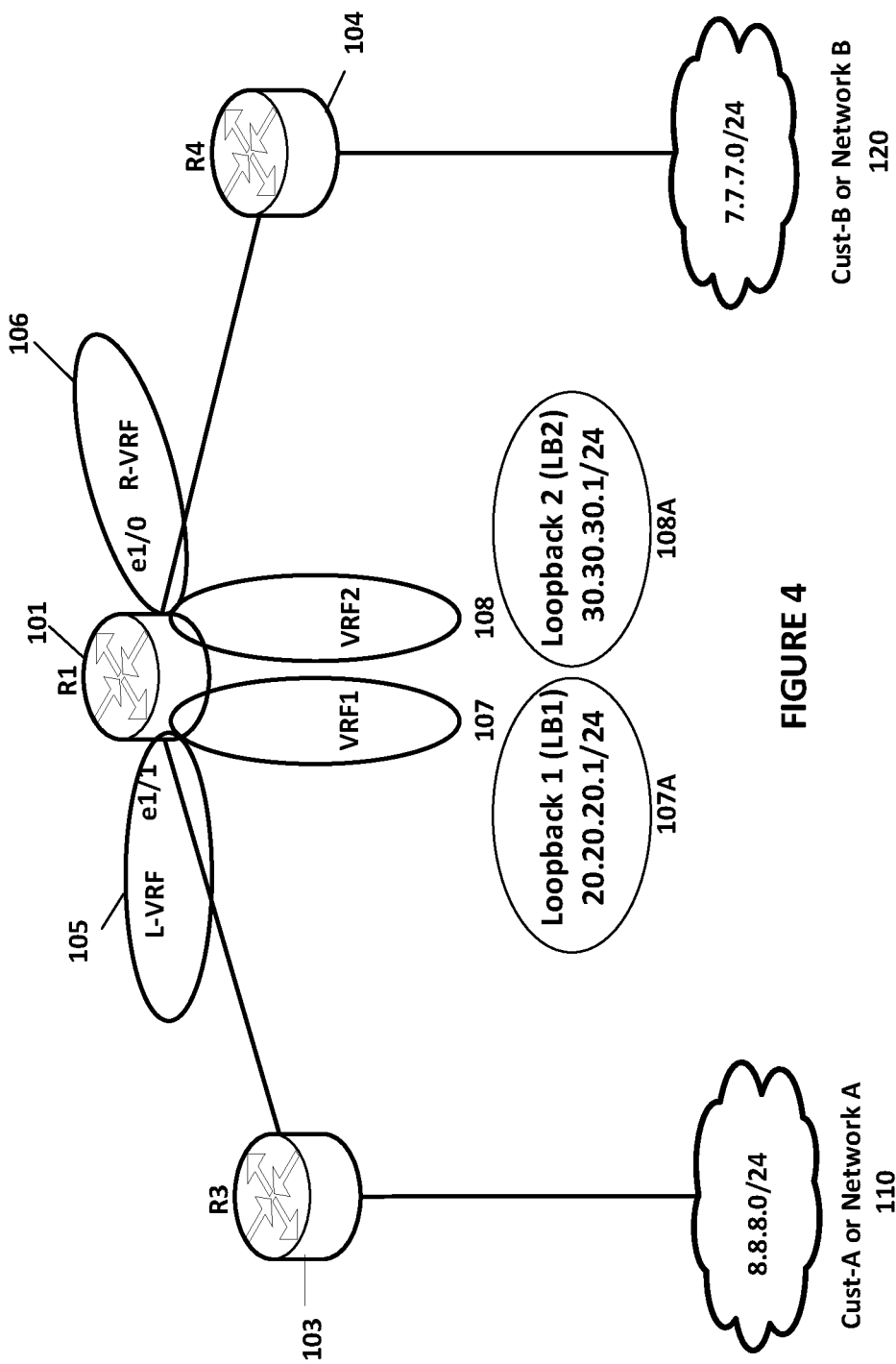
FIG. 4 illustrates a network scenario wherein embodiments herein may be employed.
Figure 5:
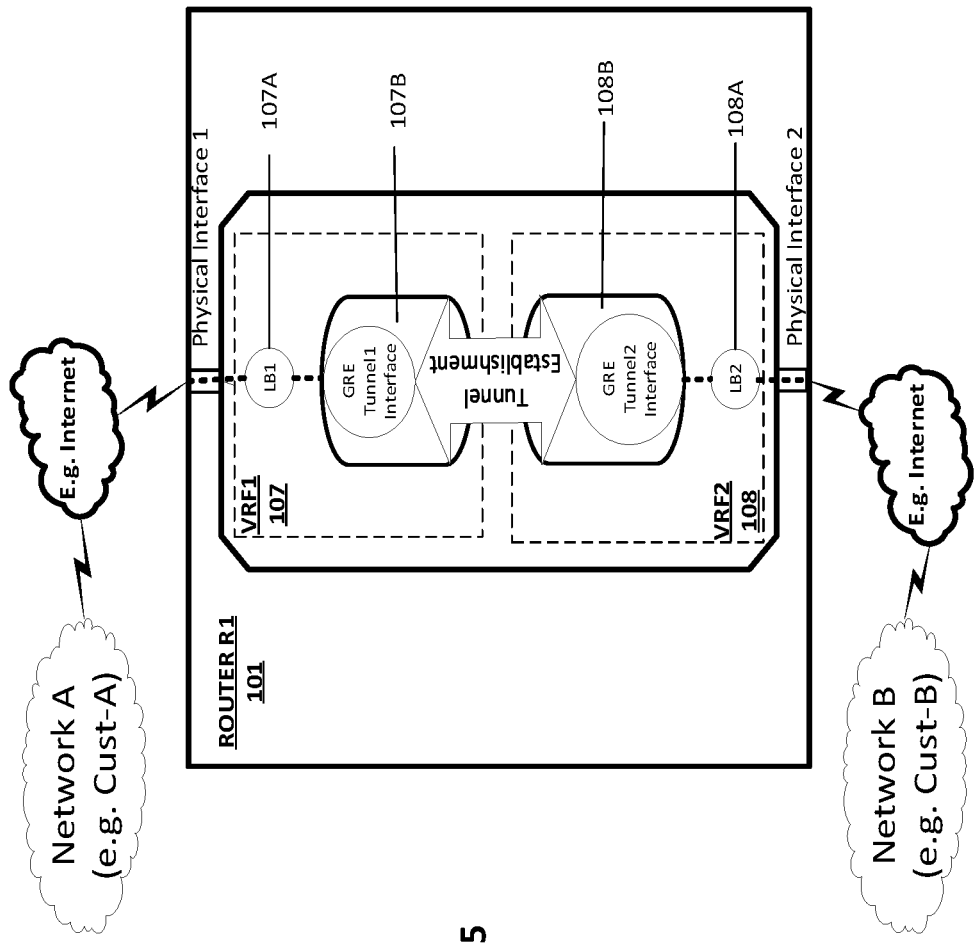
FIG. 5 depicts another network scenario depicting a router device wherein embodiments herein may be employed.

Referring to FIG. 4 and FIG. 5, there are illustrated two network scenarios wherein embodiments herein may be employed. As shown in FIG. 4, there is no need for an extra switch device compared to the scenario of FIG. 3.

Instead, and according to embodiments herein and as shown in FIG. 4 and FIG. 5 two loopback interfaces are configured or created and are denoted Loopback1 (or LB1) 107A and Loopback2 (or LB2) 108A. LB1 107A is assigned to VRF1 107 and LB2 108A is assigned to VRF2 108.

An example of commands used to create or configure, in Router R1 101, the loopback interfaces (or loopback adapters) and assign each one of them to a VRF, is shown below with reference to FIG. 5, which shows router R1 101 connected to two networks, Network A (e.g. Cust-A) and Network B (e.g. Cust-B) via, e.g., internet or other networks by means physical interfaces 1 and 2:

1) Creating/configuring Loopback 1 (or LB1) 107A and assigning to internal VRF1 107 (or first VRF) and creating or configuring Loopback 2 (or LB2) 108A and assigning to internal VRF2 108 (or second VRF) in Router R1 101. A short explanation of each command line is also provided:

```
R1#
interface Loopback1        \\create loopback interface (Loopback1)
ip vrf forwarding VRF1     \\assign the loopback to VRF1
ip address 20.20.20.1/24   \\assign IP address to Loopback1
interface Loopback2        \\create loopback interface (Loopback2)
ip vrf forwarding VRF2     \\assign the loopback to VRF2
ip address 30.30.30.1/24   \\assign IP address to Loopback2
```

The IP addresses of Loopback1 107A and Loopback2 108A are in different subnets i.e.:
Subnet-1 20.20.20.0/24 for Loopback1 (or LB1) having IP address 20.20.20.1/24
Subnet-2 30.30.30.0/24 for Loopback2 (or LB2) having IP address 30.30.30.1/24

It must be noted that the IP address or addresses 20.20.20.1/24 and 30.30.30.1/24 or the subnets 20.20.20.0/24 and 30.30.30.0/24 are only examples.

According to embodiments herein, at least a first tunnel and a second tunnel are configured or created to be used by interfaces within the router device R1. The tunnels may be Generic Routing Encapsulation (GRE) tunnels.

As shown in FIG. 5, the first GRE tunnel (or tunnel interface) 107B is assigned to VRF1 107 and the second GRE tunnel (or tunnel interface) 108B is assigned to VRF2 108. An example of commands used for the creation/configuration of the GRE tunnels and the assignment of the GRE tunnels in router device R1 101 is shown below:
2) Creating/configuring GRE tunnels (denoted GRE Tunnel1 interface and GRE Tunnel2 interface) and assigning to VRF1 107 and VRF2 108 respectively in Router R1 101. A short explanation is also given for each command line:

```
R1#
interface Tunnel1          \\create GRE tunnel interface (Tunnel1)
ip vrf forwarding VRF1     \\assign Tunnel1 to VRF1
interface Tunnel2          \\create GRE tunnel interface (Tunnel2)
ip vrf forwarding VRF2     \\assign Tunnel2 to VRF2
```

According to an embodiment, the tunnel interface IP address on each tunnel is defined or configured. These tunnel interface IP addresses or endpoint IP addresses are automatically placed to assigned VRF to the respective tunnel.
3) Define or assign tunnel interface IP address on each tunnel:

```
R1#
interface Tunnel1
ip vrf forwarding VRF1
ip address 10.10.10.1/24   \\assign IP address to Tunnel1
interface Tunnel2
ip vrf forwarding VRF2
ip address 10.10.10.2/24   \\assign IP address to Tunnel2
```

In the command lines above we assign for the first GRE tunnel (Tunnel1) 107B an IP address (here 10.10.10.1/24) and we assign for the second GRE tunnel (Tunnel2) 108B an IP address (here 10.10.10.2/24). According to an embodiment, the IP addresses of the first GRE tunnel 107B and the second GRE tunnel 108B are different but they are in the same subnet 10.10.10.0/24.

The IP address 10.10.10.1/24 is only an example of an IP address for the tunnel interface IP address for Tunnel1 107B and 10.1010.2/24 is also only an example for the tunnel interface IP address for Tunnel2 108B.

According to yet another embodiment, for the first GRE tunnel (Tunnel1) 107B we assign the first loopback interface (Loopback1 or LB1) 107A as a source point of Tunnel1 and we assign the second loopback interface (Loopback2 or LB2) 108A as a destination point of Tunnel1.

Similarly, for the second GRE tunnel (Tunnel2) 108B, we assign the second loopback interface (Loopback2 or LB2) 108A as a source point of Tunnel2 and assign the first loopback interface (Loopback1 or LB1) 107A as a destination point of Tunnel2. This is shown in the following configuration:
4) Define tunnel source and destination in R1.

R1 #
interface Tunnel1
ip vrf forwarding VRF1
ip address 10.10.10.1/24
tunnel source Loopback1
tunnel destination 30.30.30.1
interface Tunnel2
ip vrf forwarding VRF2
ip address 10.10.10.2/24
tunnel source Loopback2
tunnel destination 20.20.20.1

As shown above, 20.20.20.1 is the IP address of Loopback1 and 30.30.30.1 is the IP address of Loopback2. Command line "tunnel source Loopback1" means that we define or assign Loopback1 as a source point of the first GRE tunnel and command line "tunnel destination 30.30.30.1" means that we define or assign the second loopback interface having address 30.30.30.1 as a destination point of the first GRE tunnel, Tunnel1.

Similarly, command line "tunnel source Loopback2" means that we define or assign Loopback2 as a source point of the second GRE tunnel and command line "tunnel destination 20.20.20.1" means that we define or assign the first loopback interface having address 20.20.20.1 as a destination point of the second GRE tunnel, Tunnel2.

As previously described, VRF technology allows multiple instances of a routing table to coexist in the same router simultaneously. This means that each VRF has its own routing table. Hence, VRF1 has one routing table and VRF2 has one routing table being different than the routing table of VRF1.

According to embodiments herein, the source IP address and the destination IP address of both the first GRE tunnel 107B and the second GRE tunnel 108B are configured to use the same routing table from a routing table of VRF1 107 or from a routing table of VRF2 108. As shown in the configurations below, the source IP address of the first GRE tunnel is Loopback1 IP address and the destination IP address of the first GRE tunnel is 30.30.30.1. The source IP address of the second GRE tunnel is Loopback2 IP address and the destination IP address of the second GRE tunnel is 20.20.20.1.

These source and IP addresses of the first respectively the second GRE tunnels are configured to use the same routing table from a routing table of VRF1 or from a routing table of VRF2 as described above.

This is defined by the last command line "tunnel vrf VRF1" in the following configurations, one for each tunnel. In this example, it is the routing table of VRF1 that is considered.

```
R1 #
interface Tunnel1
ip vrf forwarding VRF1
ip address 10.10.10.1/24
tunnel source Loopback1
tunnel destination 30.30.30.1
tunnel vrf VRF1
interface Tunnel2
ip vrf forwarding VRF2
ip address 10.10.10.2/24
tunnel source Loopback2
tunnel destination 20.20.20.1
tunnel vrf VRF1
```

It should be noted that the same applies if, instead of using command line "tunnel vrf VRF1", we use command line "tunnel vrf VRF2". Importantly is that the last command line is the same for both configurations so to point to both tunnels, Tunnel1 and Tunnel2, to use the same routing table from a routing table of either VRF1 107 (using command line "tunnel vrf VRF1") or of VRF2 108 (using command line "tunnel vrf VRF2").

Now that the GRE tunnels are configured and there is a tunnel established between them, two static routes between the VRFs may be configured or created according to embodiments herein.

A first static route may be configured on VRF1 107 to route packets destined to a network behind VRF2 108 by defining the IP address of the second GRE tunnel 108B as the destination. In the example of FIG. 5, the network behind VRF2 108 is Network B (or a first network).

In a similar way, the second static route may be configured on VRF2 108 to route traffic destined to a network behind VRF1 107 by defining the IP address of the first GRE tunnel 107B as the destination. The network behind VRF1 107 is Network A (or a second network).

An example of the configuration of the first static route used to route packets to Network-B is shown below:
```
R1 #
ip route vrf VRF1 Network-B 10.10.10.2
```
An example of the configuration of the second static route used to route packets to Network A is shown below:
```
R1 #
ip route vrf VRF2 Network-A 10.10.10.1
```

As shown above, the IP addresses 10.10.10.1 and 10.10.10.2 for the first GRE tunnel and for the second GRE tunnel respectively are in the same subnet, which is 10.10.10.0/24. As an example, Network-B may have IP address 7.7.7.0/24 as IP address of Cust-B and Network-A may have IP address 8.8.8.0/24 as IP address of Cust-A. Note however that these addresses are only examples.

Using the configurations of the static routes above, traffic or data packets are successfully routed between Network A and Network B (or vice versa), through the internal VRF1 107 and the internal VRF2 108, i.e., routing between the two internal VRFs is achieved without the use of an external switch and also without using internal physical interfaces inside the router for VRF1 107 and VRF2 108.

Another advantage of the solution presented above is that it is scalable and additional latency is avoided because running the router internally is much faster instead of back and forth traffic between a router device and, e.g., an external switch device.

Figure 6:
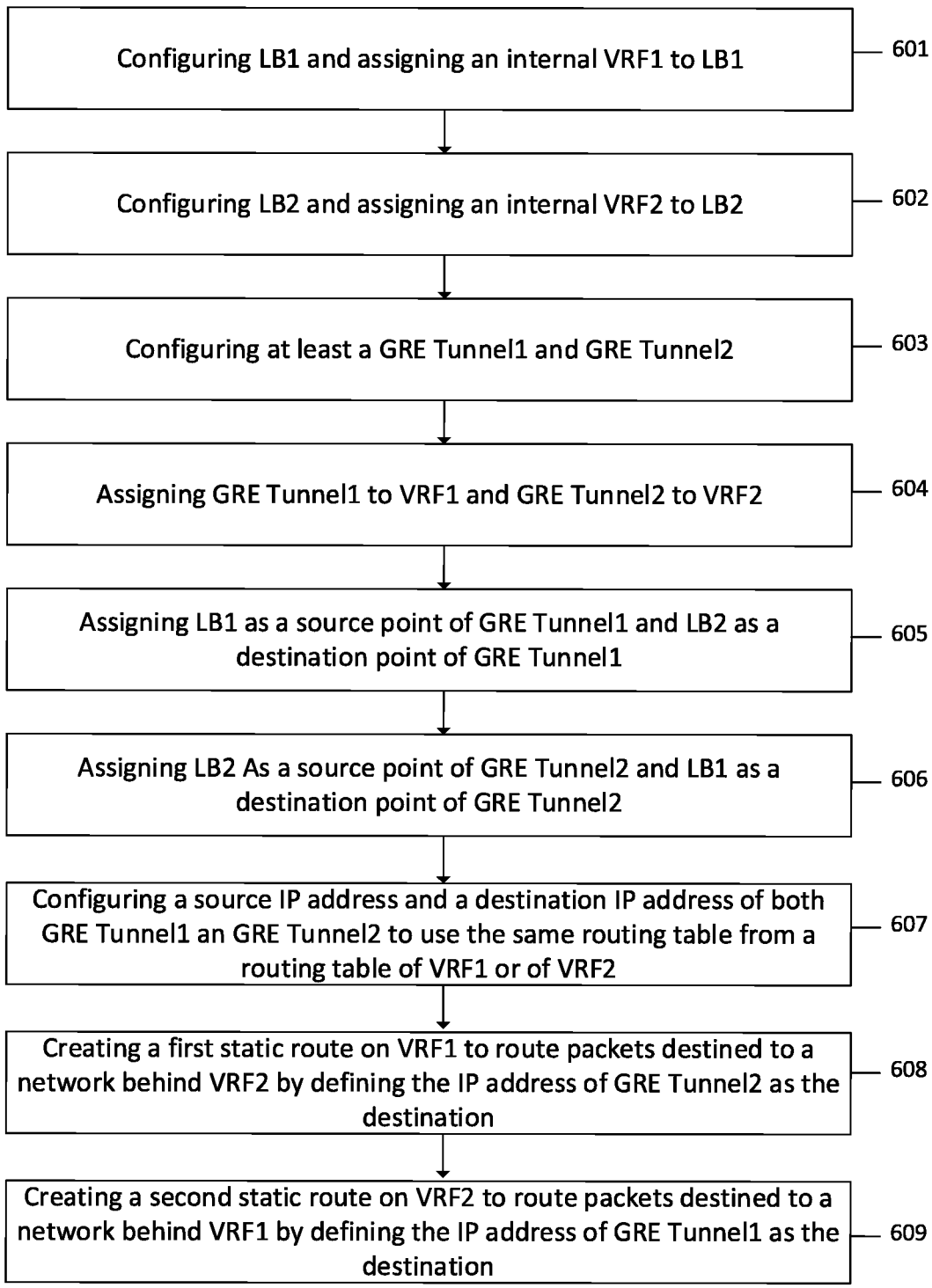
FIG. 6 illustrates a flowchart of a method performed by a router device according to some embodiments herein.

Referring to FIG. 6, there is illustrated a flowchart of a method accordance with some embodiments herein.

As shown, the main steps comprise:

(601) configuring a first loopback interface (e.g., LB1) and assigning an internal virtual route forwarder (VRF1) to the first loopback interface;

(602) configuring a second loopback interface (e.g., LB2) and assigning an VRF2, to the second loopback interface; the internal VRF2 being different from the internal VRF1;

(603) creating or configuring at least a first GRE tunnel (e.g., Tunnel1) and a second GRE tunnel (e.g., Tunnel2) to be used by interfaces within the router device;

(604) assigning the first GRE tunnel to the internal VRF1 and assigning the second GRE tunnel to the internal VRF2;

(605) for the first GRE tunnel, assigning the first loopback interface as a source point of the first GRE tunnel and assigning the second loopback interface as a destination point of the first GRE tunnel;

(606) for the second GRE tunnel, assigning the second loopback interface as a source point of the second GRE tunnel and assigning the first loopback interface as a destination point of the second GRE tunnel;

(607) configuring a source IP address and a destination IP address of both the first GRE tunnel and the second GRE tunnel to use the same routing table from a routing table of VRF1 or from a routing table of VRF2;

(608) creating or configuring a first static route on VRF1 to route data packets destined to a network behind VRF2 by defining the IP address of the second GRE tunnel as the destination; and (609) creating or configuring a second static route on VRF2 to route traffic destined to a network behind VRF1 by defining the IP address of the first GRE tunnel as the destination.

The network behind VRF2 may be a first network such as Network B shown in FIG. 5, and the network behind VRF1 may be a second network such as Network A shown in FIG. 5.

As previously described, the method further comprises assigning to the source point of the first GRE tunnel, the first loopback interface as a source IP address and assigning to the destination point of the first GRE tunnel, the second loopback interface as a destination IP address.

The method further comprises assigning to the source point of the second GRE tunnel, the second loopback interface as a source IP address and assigning to the destination point of the second GRE tunnel, the first loopback interface as a destination IP address.

Assigning the first GRE tunnel to the internal VRF1 and assigning the second GRE tunnel to the internal VRF2 further comprises assigning an IP address for the first GRE tunnel and assigning an IP address for the second GRE tunnel, and wherein the assigned IP address for the first GRE tunnel and the assigned IP address for the second GRE tunnel are in a same subnet, as previously described.

As described above, the IP address of the first GRE tunnel and the IP address of the second GRE tunnel are in a same subnet. But the IP address of the first loopback and the IP address of the second loopback are in different subnets.

Further, IP addresses of the first loopback interface and IP addresses of the second loopback interface are in different subnets, and the subnet used for the first and second GRE tunnels is different from each of the subnets of the first loopback interface and the subnet of the second loopback interface.

Figure 7:
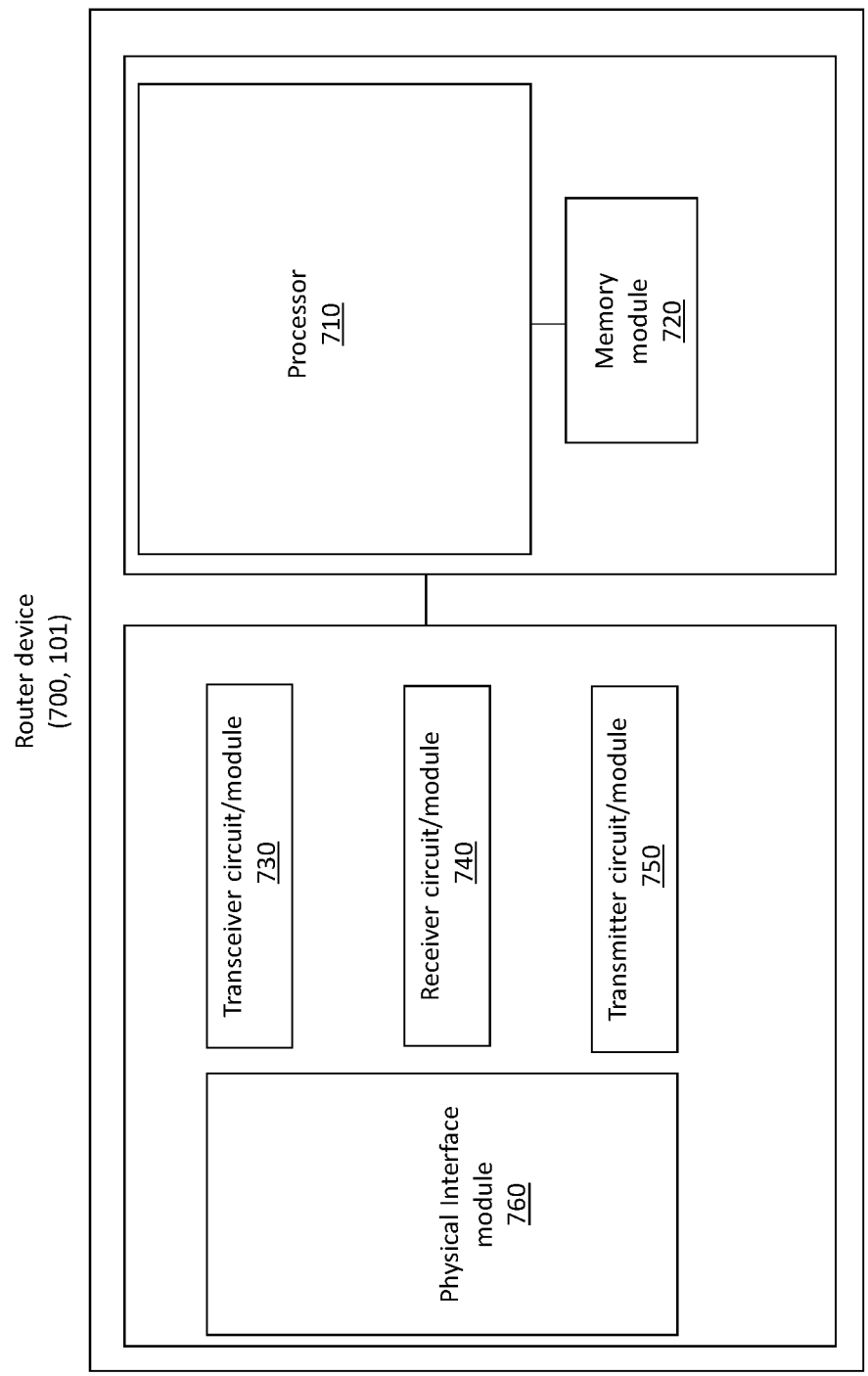
FIG. 7 illustrates a block diagram of a router device according to some embodiments herein.

To perform the method described above, a router device 700 is provided as shown in a simplified block diagram of FIG. 7. It should be noted that the router device 700 is configured to perform functions or operations of router device R1 101 previously described and shown with reference to FIG. 5. Therefore, in FIG. 7, both reference numbers 700 and 101 are used for the router device. As shown, the router device 700 comprises a processing circuit or a processing module or a processor 710; a memory module 720; a receiver circuit or receiver module 740; a transmitter circuit or transmitted module 750; and a transceiver circuit or transceiver module 730 which may include the transmitter circuit 750 and the receiver circuit 740. The router may be a wireless router device or fixed router device that can be connected through cables to hosts and to other network devices. The router device 700 may support any radio access technology including 2G, 3G, 4G, 5G, Wifi, Wimax or a combination thereof.

The processing module/circuit 710 includes a processor, microprocessor, an application specific integrated circuit (ASIC), field programmable gate array (FPGA), or the like, and may be referred to as the "processor 710." The processor 710 controls the operation of the router 400 and its components. Memory (circuit or module) 720 includes a random-access memory (RAM), a read only memory (ROM), and/or another type of memory to store data and instructions that may be used by processor 710. In general, it will be understood that the router device 700 in one or more embodiments includes fixed or programmed circuitry that is configured to carry out the operations in any of the embodiments disclosed herein.

The processor 710 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 710 to carry out the operations of the router device 700 disclosed herein. The figure also shows a simplified example of a physical interface module 760 which comprises at least two physical interfaces (not shown) such as the ones shown in FIG. 5. It will be appreciated that the router device 700 may comprise additional components not shown in FIG. 7.

The router device 700, 101, by means of processor 710, is operative to: configure a first loopback interface and assign an internal virtual route forwarder (VRF1) to the first loopback interface; configure a second loopback interface and assign an internal virtual route forwarder (VRF2) to the second loopback interface; said internal VRF2 being different from the internal VRF1; create or configure at least a first GRE tunnel and a second GRE tunnel to be used by interfaces within the router device; assign the first GRE tunnel to the internal VRF1 and assign the second GRE tunnel to the internal VRF2. The router device 700,101, is further operative to, for the first GRE tunnel, assign the first loopback interface as a source point of the first GRE tunnel and assign the second loopback interface as a destination point of the first GRE tunnel. The router device 700,101, is further operative to, for the second GRE tunnel, assign the second loopback interface as a source point of the second GRE tunnel and assign the first loopback interface as a destination point of the second GRE tunnel. The router device 700, 101, is further operative to assign the first GRE tunnel to the internal VRF1 and assigning the second GRE tunnel to the internal VRF2; configure a source IP address and a destination IP address of both the first GRE tunnel and the second GRE tunnel to use the same routing table from a routing table of VRF1 or from a routing table of VRF2; create or configure a first static route on VRF1 to route data packets destined to a network behind VRF2 by defining the IP address of the second GRE tunnel as the destination; and create or configure a second static route on VRF2 to route data packets to a network behind VRF1 by defining the IP address of the first GRE tunnel as the destination. As mentioned earlier, the network behind VRF2 may be a first network (e.g., Network-B) and the VRF behind VRF1 may be a second network (e.g., Network-A) which is different from the first network.

The router device 700, 101 is operative to assign to the source point of the first GRE tunnel the first loopback interface as a source IP address and assign to the destination point of the first GRE tunnel the second loopback interface as a destination IP address. The router device 700, 101 is further operative to configure to the source point of the second GRE tunnel, the second loopback interface as a source IP address and assign to the destination point of the second GRE tunnel, the first loopback interface as a destination IP address. The router device 700, 101 is further operative to assign an IP address for the first GRE tunnel and assign an IP address for the second GRE tunnel, and wherein the assigned IP address for the first GRE tunnel and the assigned IP address for the second GRE tunnel are in a same subnet.

Further, IP addresses for the first loopback interface and IP addresses for the second loopback interface are in different subnets, and wherein the subnet used for the first and second GRE tunnels is different from each of the subnets of the first loopback and the subnet of the second loopback. As previously described VRF1 and VRF2 are both internal VRFs of the router device 700, 101.

There is also provided a computer program comprising instructions which when executed on at least one processor 710 of the router device 700 according to embodiments herein, cause the at least one processor 710 to carry out the method previously described. Also, a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method, performed by a router device, the method comprising:
configuring a first loopback interface and assigning an internal Virtual Route Forwarder (VRF1) to the first loopback interface;
configuring a second loopback interface and assigning an internal Virtual Route Forwarder (VRF2) to the second loopback interface, said internal VRF2 being different from the internal VRF1;
creating or configuring at least a first Generic Routing Encapsulation, GRE, tunnel and a second GRE tunnel to be used by interfaces within the router device;
assigning the first GRE tunnel to the internal VRF1 and assigning the second GRE tunnel to the internal VRF2;
for the first GRE tunnel, assigning the first loopback interface as a source point of the first GRE tunnel and assigning the second loopback interface as a destination point of the first GRE tunnel;

for the second GRE tunnel, assigning the second loopback interface as a source point of the second GRE tunnel and assigning the first loopback interface as a destination point of the second GRE tunnel;

configuring a source Internet Protocol, IP, address and a destination IP address of both the first GRE tunnel and the second GRE tunnel to use the same routing table from a routing table of VRF1 or from a routing table of VRF2;

creating or configuring a first static route on VRF1 to route internally within the router device data packets destined to a network behind VRF2 by defining the IP address of the second GRE tunnel as the destination; and creating or configuring a second static route on VRF2 to route internally within the router device data packets destined to a network behind VRF1 by defining the IP address of the first GRE tunnel as the destination.

2. The method according to claim 1, further comprising:
assigning to the source point of the first GRE tunnel, the first loopback interface as a source IP address; and
assigning to the destination point of the first GRE tunnel, the second loopback interface as a destination IP address.

3. The method according to claim 1, further comprising:
configuring to the source point of the second GRE tunnel, the second loopback interface as a source IP address; and
assigning to the destination point of the second GRE tunnel, the first loopback interface as a destination IP address.

4. The method according to claim 1, wherein assigning the first GRE tunnel to the internal VRF1 and assigning the second GRE tunnel to the internal VRF2 further comprises:
assigning an IP address for the first GRE tunnel and assigning an IP address for the second GRE tunnel, and wherein the assigned IP address for the first GRE tunnel and the assigned IP address for the second GRE tunnel are in a same subnet.

5. The method according to claim 1, wherein IP addresses of the first loopback interface and IP addresses of the second loopback interface are in different subnets, and wherein the subnet used for the first and second GRE tunnels is different from each of the subnets of the first loopback interface and the subnet of the second loopback interface.

6. A router device comprising a processor and a memory, said memory containing instructions executable by said processor whereby said router device is operative to:
configure a first loopback interface and assign an internal Virtual Route Forwarder, VRF1, to the first loopback interface;
configure a second loopback interface and assign an internal virtual route forwarder, VRF2, to the second loopback interface; said internal VRF2 being different from the internal VRF1;
create or configure at least a first Generic Routing Encapsulation, GRE, tunnel and a second GRE tunnel to be used by interfaces within the router device;
assign the first GRE tunnel to the internal VRF1 and assigning the second GRE tunnel to the internal VRF2;
for the first GRE tunnel, assign the first loopback interface as a source point of the first GRE tunnel and assign the second loopback interface as a destination point of the first GRE tunnel;
for the second GRE tunnel, assign the second loopback interface as a source point of the second GRE tunnel and assigning the first loopback interface as a destination point of the second GRE tunnel;
configure a source Internet Protocol, IP, address and a destination IP address of both the first GRE tunnel and the second GRE tunnel to use the same routing table from a routing table of VRF1 or from a routing table of VRF2;
create or configure a first static route on VRF1 to route internally within the router device data packets destined to a network behind VRF2 by defining the IP address of the second GRE tunnel as the destination; and
create or configure a second static route on VRF2 to route internally within the router device data packets to a network behind VRF1 by defining the IP address of the first GRE tunnel as the destination.

7. The router device according to claim 6, wherein the router device is further operative to:
assign to the source point of the first GRE tunnel, the first loopback interface as a source IP address; and
assign to the destination point of the first GRE tunnel, the second loopback interface as a destination IP address.

8. The router device according to claim 6, wherein the router device is further operative to:
configure to the source point of the second GRE tunnel, the second loopback interface as a source IP address: and
assign to the destination point of the second GRE tunnel, the first loopback interface as a destination IP address.

9. The router device according to claim 6, wherein the router device is further operative to:
assign an IP address for the first GRE tunnel; and
assign an IP address for the second GRE tunnel, and wherein the assigned IP address for the first GRE tunnel and the assigned IP address for the second GRE tunnel are in a same subnet.

10. The router device according to claim 6, wherein IP addresses for the first loopback interface and IP addresses for the second loopback interface are in different subnets, and wherein the subnet used for the first and second GRE tunnels is different from each of the subnets of the first loopback interface and the subnet of the second loopback interface.

11. The router device according to claim 6, wherein VRF1 and VRF2 are both internal VRFs of the router device.

* * * * *